Sept. 4, 1951 H. P. KUPIEC 2,567,073
HYDRAULIC VALVE
Filed May 25, 1946 3 Sheets-Sheet 1
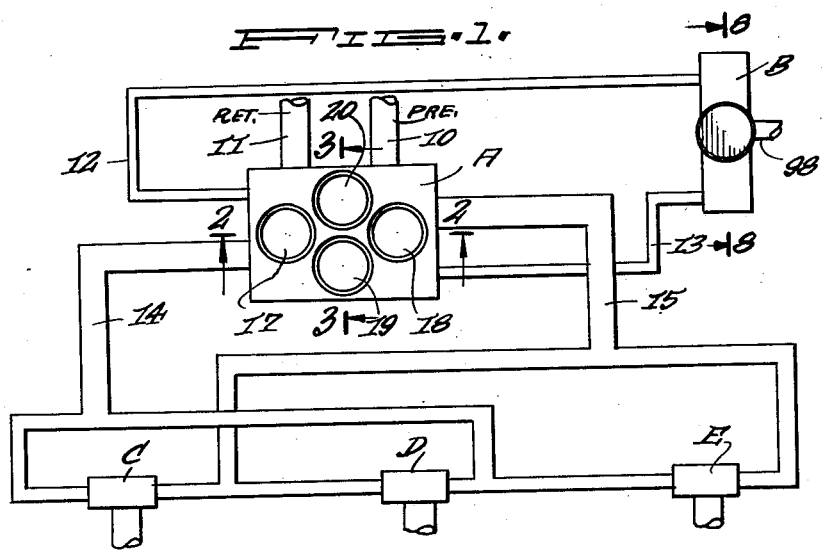
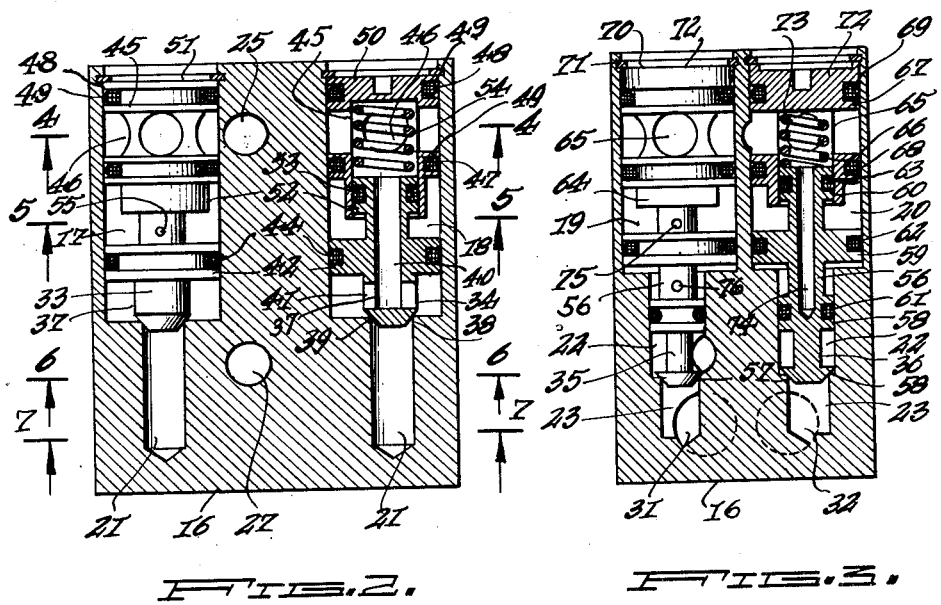
INVENTOR.
HARRY P. KUPIEC.
BY Clark + Ott
ATTORNEYS.

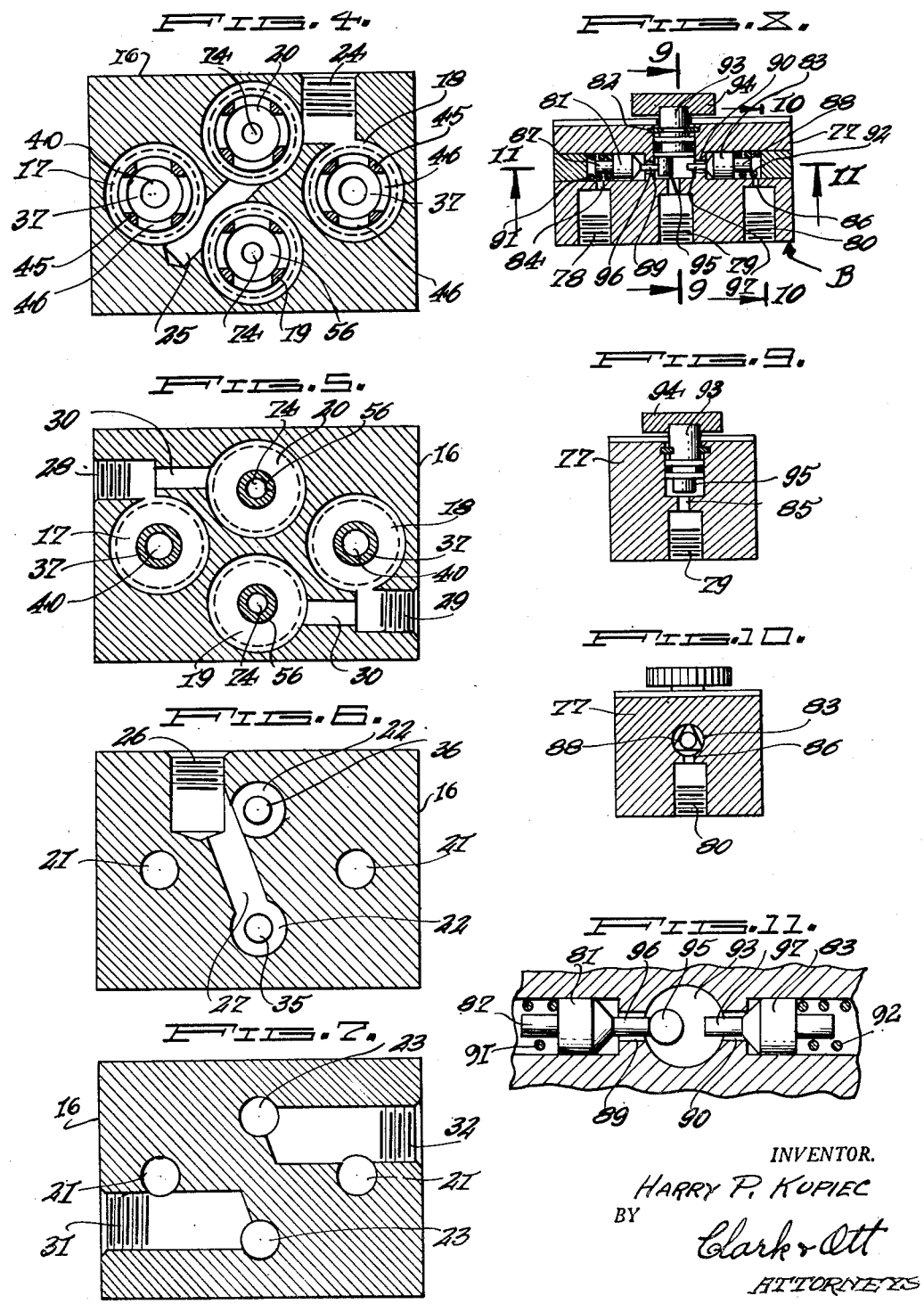

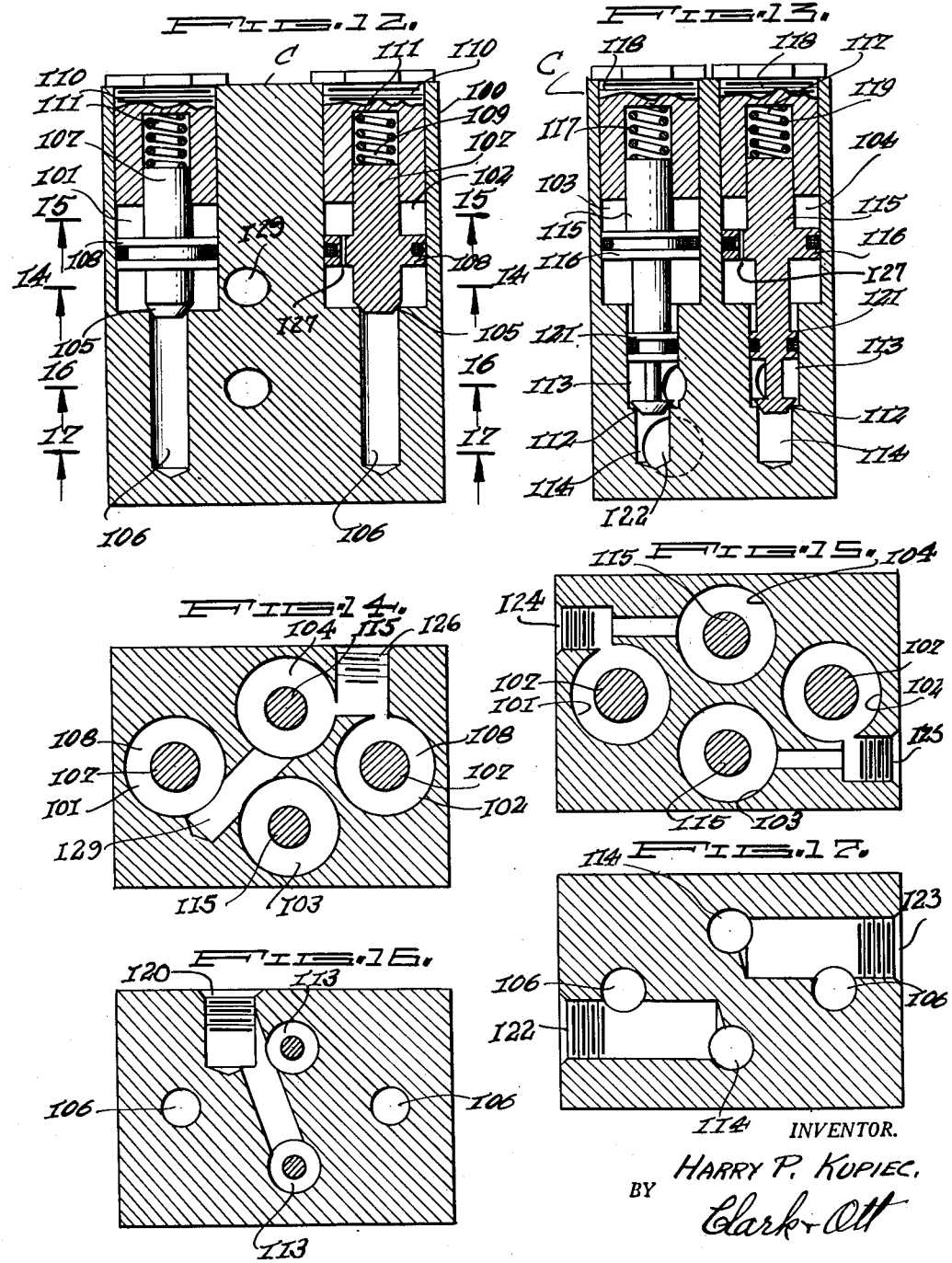

Patented Sept. 4, 1951

2,567,073

UNITED STATES PATENT OFFICE 2,567,073

HYDRAULIC VALVE

Harry P. Kupiec, Fair Lawn, N. J., assignor to Air Associates, Incorporated, Teterboro, N. J., a corporation of New Jersey Application May 25, 1946, Serial No. 672,297

3 Claims. (Cl. 121—46.5)

This invention relates to hydraulic valves and while not limited thereto the same has particular reference to a hydraulic valve and control therefor for reversing the flow of a fluid for the purpose of raising and lowering landing gear of airplanes or actuating other operational mechanisms.

The invention comprehends a hydraulic valve which provides a simplified means of control of hydraulically operated mechanisms and which is compact and economizes in weight and space which it occupies, is capable of operating with standard aircraft pressures as well as in systems using pressures of less than 1000 pounds per square inch and in excess of 3000 pounds per square inch, and in which the hydraulic fluid may be oil, water or other liquid or air or a gas.

The invention further has in view a hydraulic valve having valve elements for controlling the flow of a fluid therethrough by differential of pressure on opposite parts of the valve elements which is established by bleeding from the valve a small quantity of the fluid through an auxiliary or control valve.

The invention also has for an object the provision of a hydraulic valve having pairs of valve elements of the poppet type mounted for reciprocatory movement in a valve body for controlling the flow of the fluid therethrough by the bleeding of a small quantity of the fluid from the valve, one of the pairs of valve elements functioning to direct the flow of the fluid in one direction through service ports to hydraulically operated mechanism while the other pair of poppet valves functioning to direct the flow of the fluid in the opposite direction through said ports.

With the foregoing and other objects in view, reference is now made to the following specification and accompanying drawings in which the preferred embodiment of the invention is illustrated.

In the drawings:

Fig. 1 is a plan view of a hydraulic system connected with cylinders for raising and lowering the landing gear of an airplane and which includes a hydraulic valve and control therefor constructed in accordance with the invention.

Fig. 2 is a longitudinal vertical sectional view taken approximately on line 2—2 of the hydraulic valve shown in Fig. 1.

Fig. 3 is a transverse vertical sectional view taken approximately on line 3—3 of the valve.

Fig. 4 is a horizontal sectional view taken approximately on line 4—4 of Fig. 2.

Fig. 5 is a similar view taken approximately on line 5—5 of Fig. 2.

Fig. 6 is a similar view taken approximately on line 6—6 of Fig. 2.

Fig. 7 is a similar view taken approximately on line 7—7 of Fig. 2.

Fig. 8 is a longitudinal vertical sectional view through the control valve taken approximately on line 8—8 of Fig. 1.

Fig. 9 is a transverse vertical sectional view taken approximately on line 9—9 of Fig. 8.

Fig. 10 is a similar view taken approximately on line 10—10 of Fig. 8.

Fig. 11 is a fragmentary horizontal sectional view taken approximately on line 11—11 of Fig. 8.

Fig. 12 is a longitudinal vertical sectional view similar to Fig. 2 embodying a modified form of hydraulic valve constructed in accordance with the invention.

Fig. 13 is a transverse vertical sectional view therethrough.

Fig. 14 is a horizontal sectional view taken approximately on line 14—14 of Fig. 12.

Fig. 15 is a horizontal sectional view taken approximately on line 15—15 of Fig. 12.

Fig. 16 is a similar view taken approximately on line 16—16 of Fig. 12.

Fig. 17 is also a similar view taken approximately on line 17—17 of Fig. 12.

Referring to the drawings by characters of reference, the valve is illustrated in the drawings in its application to a system for hydraulically controlling mechanisms for operating landing gear for airplanes. It is not limited to such use, however, and may be employed in any device for moving pistons and the like in opposite directions. In the embodiment illustrated the valve indicated generally by the reference character A is connected in a hydraulic system with pressure supply and return lines 10 and 11, bleed lines 12 and 13 leading to opposite ports of an auxiliary or control valve B and service lines 14 and 15 leading to opposite ports of one or more cylinders for operating a mechanism and which as illustrated leads to cylinders C, D and E for operating the left main gear, nose wheel, and right main gear of a landing gear of an airplane.

The valve A consists of a valve body 16 of any desired configuration and which as illustrated is of rectangular formation in vertical and horizontal sections. The body 16 is formed with four parallel wells or bores 17, 18, 19 and 20 which open through the upper face thereof and are arranged with the bores 17 and 18 located centrally on the longitudinal medial line of the body adjacent the opposite ends thereof and with the bores 19 and 20 located centrally on the transverse medial line of the body adjacent the opposite sides thereof. The bores 17 and 18 are similar in formation and depth and have reduced bores 21 arranged coaxially therewith and extending downwardly therefrom with their lower ends terminating adjacent the lower face of the body. The bores 19 and 20 are also of similar formation and depth and have reduced bores 22 and 23 arranged coaxially therewith and extending successively downward therefrom with the lowermost bore 23 terminating adjacent the lower face of the body.

The valve body 16 is formed with a threaded aperture 24 located adjacent the top wall thereof and opening at its inner end into the bores 18 and 20. Communicating with the aperture 24 through the bore 20 is a diagonal passageway 25 which opens into the bores 17 and 19. The aperture 24 threadedly receives the pressure supply line 10 so as to provide a fluid pressure port leading to the bores 17, 18, 19 and 20 for admitting fluid under pressure thereto.

The valve body 16 is also provided with a threaded aperture 26 which opens through the same side wall thereof as the threaded aperture 24 and communicates at its inner end with a diagonal passageway 27 opening into the reduced bores 22. The aperture 26 threadedly receives the return line 11 and defines a return port for discharging the fluid from the reduced bores through the return line 11.

Located below the pressure supply port 24 and above the bottom of the bores 19 and 20 are threaded apertures 28 and 29 in the valve body which open through the opposite end walls thereof and communicate at their inner ends with the bores 17 and 18. The said apertures receive the threaded ends of the bleed lines 12 and 13 and have reduced passageways 30 communicating at their inner ends with the bores 19 and 20 for conveying a small portion of the fluid from said bores through the auxiliary or control valve B. The service lines 14 and 15 are connected with threaded ports 31 and 32 in the valve body which open through the opposite ends thereof and communicate with the reduced bores 21 and 23.

The flow of the fluid through the valve body 16 is controlled by the movement of valve elements 33, 34, 35 and 36 arranged in the bores 17, 18, 19 and 20 respectively. The valve elements 33 and 34 control the flow of the fluid through the service ports 31 and 32 while the valve elements 35 and 36 control the return of the fluid through said ports. The valve elements 33 and 34 are of similar formation and each consists of a stem 37 having a conical shaped end 38 adapted to engage a valve seat 39 at the upper ends of the reduced bores 21 for closing the passageways to the service ports 31 and 32. The stems 37 are each formed with a longitudinal extending central bore 40 opening through the upper end thereof and having lateral outlets 41 opening into the bores 17 and 18 above the conical shaped lower end 38 thereof. The stems 37 have peripherally grooved annular flanges 42 above the lateral outlets 41 in which are arranged annular sealing elements 44 snugly engaging with the peripheral walls of the bores 17 and 18 respectively so as to prevent leakage of the fluid past said flanges. The said flanges also constitute piston heads for effecting movement of the valve elements in opposite directions by the pressure differential of the fluid on opposite sides thereof. The stems 37 have their upper ends slidably arranged in annular elements 45 disposed in the upper ends of the bores 17 and 18 and which elements are formed with quadrantly spaced lateral openings 46 located in alignment with the passageways leading to the fluid pressure port 24. The annular elements 45 are formed with peripherally grooved flanges 47 and 48 located above and below the lateral openings 46 in which are arranged annular sealing elements 49 for preventing leakage of the fluid admitted thereto through the fluid pressure port 24. The said annular elements have closed upper ends 50 and are retained in position in the bores by means of split rings 51 engaging in grooves in the peripheral walls of the bores adjacent the upper ends thereof.

In order to prevent leakage of the fluid from the annular elements 45 into the annular spaces above the flanges 42 of the stems 37, the upper ends of the stems are formed with peripherally grooved flanges 52 in which are arranged annular sealing elements 53 snugly engaging against the inner walls of the annular elements. The valve elements 33 and 34 are normally maintained with the conical shaped ends 38 in engagement with the seats 39 by means of coiled expansion springs 54 located within the annular elements 45 and tensioned between the closed ends 50 and the flanged upper ends of the stems 37. A plurality of relatively small apertures 55 open through the walls of the bores 40 to permit the passage of the fluid from said bores into the annular spaces above the flanges 42.

The valve elements 35 and 36 are of similar formation and each consists of a stem 56 having a conical shaped lower end 57 adapted to engage an annular valve seat 58 at the upper end of each of the reduced bores 23 for shutting off the passageways to the service ports 31 and 32. The said stems are each provided with spaced peripherally grooved annular flanges 58, 59 and 60 in which are arranged annular sealing elements 61, 62 and 63 snugly engaging with the annular walls of the reduced bores 22, the bores 19 and 20 and the inner annular walls of annular elements 64 respectively. The flanges 59 provide piston heads against which the pressure of the fluid is exerted for effecting movement of said valve elements in opposite directions by the differential of the pressure of the fluid thereon regulated by the control valve B. The annular elements 64 are formed with quadrantly spaced apertures 65 for admitting fluid from the fluid pressure port 24 and above and below the said apertures the annular elements are provided with peripherally grooved annular flanges 66 and 67 in which are arranged annular sealing elements 68 and 69 for preventing leakage of the fluid from within said annular elements. The annular elements 64 are secured in the upper ends of the bores 19 and 20 by means of split rings 70 secured in annular grooves 71 in the inner face of the bores and disposed against the closed ends 72 of said annular element. The said valve elements 35 and 36 are normally maintained in seated engagement on the valve seats 58 by means of coiled expansion spring 73 located within the annular elements and tensioned against the closed ends 72 thereof and against the upper ends of the stems 56. The valve elements 35 and 36 are each provided with longitudinally extending bores 74 in the stems 56 thereof which open through the upper ends thereof and have lateral openings 75 and 76 for admitting fluid to the annular spaces above and below the intermediate flanges 58 thereof.

The differential of fluid pressure on opposite sides of the flanges 42 of the valve elements 33 and 34 and above and below the flanges 59 of the valve elements 35 and 36 is obtained by bleeding a relatively small quantity of the fluid from the annular spaces between the flanges 42 and the annular elements 45 and from the annular spaces between the flanges 59 and the annular elements 64 through the ports 28 and 29 and the bleed lines 12 and 13 and discharging the same through the control valve B.

The control valve B consists of a valve body 77 formed with aligned threaded apertures 78, 79 and 80 opening through the lower face thereof and which communicate respectively with chambers 81, 82 and 83 by means of reduced connecting passageways 84, 85 and 86. The chambers 81 and 83 are disposed in longitudinal alignment and constitute valve chambers for reciprocatory valve elements 87 and 88 having tapered forward ends adapted to engage and seat on reduced openings 89 and 90 located at the inner ends thereof and communicating with the intermediate chamber 82. The valve elements 87 and 88 are normally maintained in seated engagement so as to close the openings 89 and 90 by means of coiled expansion springs 91 and 92 tensioned against the ends of the chambers and the reduced outer ends of the valve elements. A shaft 93 is arranged in the intermediate chamber 82 and is provided with a handle 94 on the protruding upper end thereof for manually turning the shaft. The shaft 93 is formed with a cam 95 at the lower end thereof which is adapted to selectively engage the reduced inner ends 96 and 97 of the valve elements 87 and 88 for camming the valve elements away from seated engagement with the openings 89 and 90 respectively. The valve elements 88 and 89 are of triangular formation in cross-sectional configuration to permit of the passage of the fluid from the threaded apertures 78 and 80 through the valve chambers and into the intermediate chamber 82 when the valves are in open relation and thence through the threaded aperture 79 for discharge through a waste pipe 98. The bleed lines 12 and 13 respectively connect with the threaded apertures 78 and 80 for conveying the fluid from the valve A to the control valve B.

In use and operation the pressure supply line 10 is connected with a source of supply to produce the desired pressure in the fluid forced through the system while the return line 11 is connected with the return side of the source of supply. When the valve is to be actuated for operating a mechanism in one direction such as the raising of the landing gear of an airplane the handle 94 of the control valve B is turned so as to cam one of the valve elements 87 or 88 to open relation. If the valve element 87 is moved to open relation the fluid pressure above the flange 42 of the valve element 33 and the fluid pressure above the flange 79 of the valve element 36 will be decreased whereby the pressure below said flanges will force the valve elements upwardly off the valve seats 39 and 57 respectively to thereby open the passageways to the service ports 31 and 32 and permit the passage of the fluid from the supply port 24 through the openings 46 in the annular element 45 and thence through the bore 40 of the valve element 33, side openings 41, passageway 21, service port 31 and service line 14 to the cylinders C, D and E. The fluid from the said cylinders is returned through the service line 15 and thence through the port 32, passageways 23 and 22 and the discharge port 26 and return line 11. When the fluid is flowing in this direction the valve elements 33 and 36 are in open relation while the valve elements 34 and 35 are in closed relation. If it is desired to move the operating mechanism in the opposite direction such as lowering the landing gear the handle member 94 of the control valve B is moved in the opposite direction to cam the valve element 88 to open relation thus reducing the pressure above the flange 42 of the valve element 34 and above the flange 59 of the valve element 35 to thereby open said valve elements and permit the flow of the fluid through the service port 32 and returned through the service port 31 or in the opposite direction than that previously described.

The apertures 55 in the valve elements 33 and 34 and the apertures 75 in the valve elements 35 and 36 are relatively small so as to limit the flow of the fluid into the annular spaces between the flanges of the valve elements and the annular elements 45 and 64 whereby the pressure in the annular spaces above the flanges will be quickly reduced upon actuation of the control valve B to open the bleed lines 12 and 13 respectively. The pressure on the opposite side of said flanges functions to move the valve elements to dispose the flanges against the ends of the annular elements 45 and 64 thus closing the apertures 55 in the valve elements 33 and 34 and the apertures 75 in the valve elements 35 and 36.

In the form of the invention illustrated in Figs. 12 to 17 inclusive of the drawings, a modified form of valve indicated generally by the reference character C is shown which includes a valve body 100 formed with four parallel wells or bores 101, 102, 103 and 104 which are similar to the wells or bores in the valve body 16 in the previous form of the invention. The bores 101 and 102 are of similar formation and are formed with valve seats 105 at the upper ends of the reduced bores 106. Mounted in the bores 101 and 102 for reciprocatory movement towards and away from the valve seats are valve elements 107 having flanged stems 108 arranged with the free ends of the stems slidably disposed in annular recesses 109 in threaded plugs 110 which close the outer ends of the bores. The valve elements 107 are normally maintained in engagement with the valve seats by means of coiled expansion springs 111 tensioned against the plugs 110 and the free ends of the stems of the valve elements.

The bores 103 and 104 are of similar formation and are formed with valve seats 112 at the juncture of the reduced bores 113 and 114. Mounted for reciprocatory movement towards and away from the valve seats are valve elements 115 formed with flanged stems 116 arranged with the free ends of the stems slidably disposed in annular recesses 117 in threaded plugs 118 which close the outer ends of the bores. The valve elements are normally maintained in resilient engagement with the seats by coiled expansion springs 119 located between the inner ends of the annular recesses 117 and the free ends of the stems of the valve elements.

In this form of the invention the valve body 100 is provided with a discharge port 120 communicating through a diagonal passageway with the reduced bores 113 between the valve seats 112 thereof and the flanges 121 similar to the discharge port 26 in the previous form of the invention. The valve body 100 is also provided with service ports 122 and 123 opening through the opposite sides thereof and which communicate respectively with one of the reduced bores 106 and one of the reduced bores 114. Bleed ports 124 and 125 are also provided similar to the bleed ports 28 and 29 in the previous form of the invention, the bleed port 124 communicating with the bores 101 and 104 while the bleed port 125 communicates with the bores 102 and 103 above the flanges of the valve elements 107 and 115.

In this form of the invention, however, the valve body 100 is provided with a pressure supply port 126 which communicates at its inner end with the bores 102 and 104 and through a diagonal passageway 129 with the bores 101 and 103 below the flanges of the valve elements 107 and 115. The flanges of the valve elements are provided with apertures 127 which open into the annular spaces between the flanges and the plugs 110 and 118 so as to permit the passage of fluid into said annular spaces to create pressure on opposite sides of the flanges. The bleeding of fluid from the annular spaces between the flanges and the plugs in the ends of the bores through the bleed ports reduces the pressure on the flanges whereby the pressure on the opposite side thereof functions to move the valve elements to open relation and thereby permit the flow of fluid through the valve C as described in the previous form of the invention.

What is claimed is:

1. In a valve, a valve body having two pairs of valve chambers, the valve chambers of one pair being of similar formation and each including a large outer portion and an inner portion of reduced size in cross-section and providing a valve seat at the upper end of said inner portion forming a valve outlet port, the valve chambers of the other pair being of similar formation and each including a large outer portion, an intermediate portion of reduced size in cross-section and an inner portion of still further reduced size in cross-section and forming a valve seat at the upper end of said inner portion providing a valve return port, valve elements having flanges slidably fitting the large portions respectively of the first mentioned pair of valve chambers and having reduced end portions respectively adapted to engage the seats of said first mentioned pair of valve chambers and said flanges having apertures for the passage of fluid for exerting pressure against opposite sides thereof, valve elements having flanges slidably fitting the large portions respectively of the second mentioned pair of valve chambers and having reduced end portions respectively adapted to engage the seats of said second mentioned pair of valve chambers and said flanges having apertures for the passage of fluid for exerting pressure against opposite sides thereof, and said last mentioned valve elements also having flanges slidably fitting said intermediate portions of the second mentioned pair of valve chambers, means resiliently urging said valve elements towards closed relation on said seats, said valve body having two service ports, one of said service ports being in communication with the reduced inner end portion of one chamber of each of said pairs of chambers and the other service port being in communication with the reduced inner end portion of the other chamber of each pair and said valve body having a fluid inlet port communicating with said large outer portions of said chambers on one side of the flanges slidably fitting said large outer portions thereof, a fluid outlet port in communication with said intermediate portions of the second mentioned pair of valve chambers and in communication with the service ports through said return ports respectively, a bleed port in communication with the large outer portion of one of the valve chambers of each pair and another bleed port in communication with the large outer portion of the other valve chamber of each pair at the opposite side of the flanges from said fluid inlet port for bleeding the fluid to thereby reduce the pressure on said flanges whereby the fluid pressure from the inlet port functions to move the valve elements to open relation so as to permit the flow of fluid through one of said valve ports and through one of the return ports when the fluid bleed port communicating therewith is open and through the other valve port and the other return port when the other bleed port is open.

2. In a valve, a valve body having two pairs of valve chambers, the valve chambers of one pair being of similar formation and each including a larger outer portion and an inner portion of reduced size in cross-section and providing a valve seat at the upper end of said inner portion forming a valve outlet port, the valve chambers of the other pair being of similar formation and each including a large outer portion, an intermediate portion of reduced size in cross-section and an inner portion of still further reduced size in cross-section and forming a valve seat at the upper end of said inner portion providing a valve return port, valve elements having flanges slidably fitting the large portions respectively of the first mentioned pair of valve chambers and having reduced end portions respectively adapted to engage the seats of said first mentioned pair of valve chambers and said valve elements having apertures for the passage of fluid for exerting pressure against opposite sides thereof, valve elements having flanges slidably fitting the large portions respectively of the second mentioned pair of valve chambers and having reduced end portions respectively adapted to engage the seats of said second mentioned pair of valve chambers and said valve elements having apertures for the passage of fluid for exerting pressure against opposite sides thereof, and said last mentioned valve elements also having flanges slidably fitting said intermediate portions of the second mentioned pair of valve chambers, means resiliently urging said valve elements towards closed relation on said seats, said valve body having two service ports, one of said service ports being in communication with the reduced inner portion of one chamber of each of said pairs of chambers and the other service port being in communication with the reduced inner portion of the other chamber of each pair and said valve body having a fluid inlet port communicating with said large outer portions of said chambers on one side of the flanges slidably fitting said large outer portions thereof, a fluid outlet port in communication with said intermediate portions of the second mentioned pair of valve chambers and in communication with the service ports through said return ports respectively, a bleed port in communication with the large outer portion of one of the valve chambers of each pair and another bleed port in communication with the large outer portion of the other valve chamber of each pair at the opposite side of the flanges from said fluid inlet port for bleeding the fluid to thereby reduce the pressure on said flanges whereby the fluid pressure from the inlet port functions to move the valve elements to open relation so as to permit the flow of fluid through one of said valve ports and through one of the return ports when the fluid bleed port communicating therewith is open and through the other valve port and the other return port when the other bleed port is open.

3. In a valve, a valve body having two pairs of valve chambers, the valve chambers of one pair being of similar formation and each including a large outer portion and an inner portion of reduced size in cross-section and providing a valve seat at the upper end of said inner portion forming a valve outlet port, the valve chambers of the other pair being of similar formation and each including a large outer portion, an intermediate portion of reduced size in cross-section and an inner portion of still further reduced size in cross-section and forming a valve seat at the upper end of said inner portion providing a valve return port, hollow valve elements having flanges slidably fitting the large portions respectively of the first mentioned pair of valve chambers and having reduced end portions respectively adapted to engage the seats of said first mentioned pair of valve chambers and said valve elements having lateral apertures communicating with the hollow interior thereof for the passage of fluid for exerting pressure against opposite sides thereof, hollow valve elements having flanges slidably fitting the large portions respectively of the second mentioned pair of valve chambers and having reduced end portions respectively adapted to engage the seats of said second mentioned pair of valve chambers and said valve elements having lateral apertures communicating with the hollow interior thereof for the passage of fluid for exerting pressure against opposite sides thereof, and said last mentioned valve elements also having flanges slidably fitting said intermediate portions of the second mentioned pair of valve chambers, means resiliently urging said valve elements towards closed relation on said seats, said valve body having two service ports, one of said service ports being in communication with the reduced inner portion of one chamber of each of said pairs of chambers and the other service port being in communication with the reduced inner portion of the other chamber of each pair and said valve body having a fluid inlet port communicating with said large outer portions of said chambers on one side of the flanges slidably fitting said large outer portions thereof, a fluid outlet port in communication with said intermediate portions of the second mentioned pair of valve chambers and in communication with the service ports through said return ports respectively, a bleed port in communication with the large outer portion of one of the valve chambers of each pair and another bleed port in communication with the large outer portion of the other valve chamber of each pair at the opposite side of the flanges from said fluid inlet port for bleeding the fluid to thereby reduce the pressure on said flanges whereby the fluid pressure from the inlet port functions to move the valve elements to open relation so as to permit the flow of fluid through one of said valve ports and through one of the return ports when the fluid bleed port communicating therewith is open and through the other valve port and the other return port when the other bleed port is open.

HARRY P. KUPIEC.

REFERENCES CITED

The following references are of record in the file of this patent:

UNITED STATES PATENTS

| Number | Name | Date |
|---|---|---|
| 537,103 | Berry | Apr. 9, 1895 |
| 1,636,859 | Dempler | July 26, 1927 |
| 1,777,128 | Powell | Sept. 30, 1930 |
| 1,930,557 | Hughes | Oct. 17, 1933 |
| 2,388,820 | Bonnell | Nov. 13, 1945 |

FOREIGN PATENTS

| Number | Country | Date |
|---|---|---|
| 25,511 | Great Britain | of 1910 |